United States Patent
Ummy

(10) Patent No.: US 11,380,294 B2
(45) Date of Patent: Jul. 5, 2022

(54) KEYLESS SYNTHESIZER

(71) Applicant: Muhammad Ali Ummy, New Hyde Park, NY (US)

(72) Inventor: Muhammad Ali Ummy, New Hyde Park, NY (US)

(*) Notice: Subject to any disclaimer, the term of this patent is extended or adjusted under 35 U.S.C. 154(b) by 0 days.

(21) Appl. No.: 16/848,190

(22) Filed: Apr. 14, 2020

(65) Prior Publication Data
US 2021/0210056 A1    Jul. 8, 2021

Related U.S. Application Data

(60) Provisional application No. 62/834,725, filed on Apr. 16, 2019.

(51) Int. Cl.
*G10H 1/00* (2006.01)
*G10H 5/02* (2006.01)
(Continued)

(52) U.S. Cl.
CPC ........... *G10H 1/0008* (2013.01); *G01S 15/10* (2013.01); *G02B 6/001* (2013.01); *G02B 6/0006* (2013.01);
(Continued)

(58) Field of Classification Search
CPC .......... G10H 1/0008; G10H 1/14; G10H 1/32; G10H 5/02; G10H 2220/201;
(Continued)

(56) References Cited

U.S. PATENT DOCUMENTS 5,920,024 A * 7/1999 Moore ............... G10H 1/00
356/28
RE37,654 E * 4/2002 Longo ............... G10H 5/007
84/645
(Continued)

FOREIGN PATENT DOCUMENTS

CN    106782468 A  *  5/2017
CN    107126697 A  *  9/2017
(Continued)

OTHER PUBLICATIONS

Yonac, AirVox, May 10, 2015, Wayback website https://web.archive.org/web/20151029113009/http://yonac.com/AirVox/ (Year: 2015).*
(Continued)

*Primary Examiner* — Christina M Schreiber
(74) *Attorney, Agent, or Firm* — Nolte Lackenbach Siegel; Myron Greenspan

(57) ABSTRACT

A keyless synthesizer t can stimulate all three senses (hearing, muscle movement and visual) at once in patients born with C.H.A.R.G.E. syndrome while they play and, at the same time, enjoy and have fun with the device. A keyless synthesizer operational by a single hand of the user includes an ultrasound range sensor responsive to the distance "d" of a user's hand from the sensor for generating a sensor signal corresponding to the distance "d". A programmable microcontroller programmed to convert the sensor signal to one of a plurality of discrete signals. A synthesizer is responsive to each discrete signal for generating a discrete tone. A multicolor generator is responsive to each discrete signal for generating a discrete color so that for each discrete signal corresponding to a distance "d" both a discreet tone and an associated discreet color are generated.

15 Claims, 16 Drawing Sheets

(51) Int. Cl.
  *G10H 1/32* (2006.01)
  *G10H 1/14* (2006.01)
  *F21V 8/00* (2006.01)
  *G01S 15/10* (2006.01)
(52) U.S. Cl.
  CPC ............ *G10H 1/14* (2013.01); *G10H 1/32* (2013.01); *G10H 5/02* (2013.01); *G10H 2220/201* (2013.01); *G10H 2220/435* (2013.01)
(58) Field of Classification Search
  CPC .............. G10H 2220/435; G01S 15/10; G02B 6/0006; G02B 6/001
  USPC .......................................................... 84/609
  See application file for complete search history.

(56) References Cited

U.S. PATENT DOCUMENTS

| | | | | |
|---|---|---|---|---|
| 7,960,639 B2* | 6/2011 | Mizuhiki | ............ | G10H 1/0008 84/622 |
| 10,968,073 B1* | 4/2021 | Alnajjar | ............ | G08B 21/0476 |
| 2005/0160902 A1* | 7/2005 | Iwai | ................. | A63C 17/012 84/723 |
| 2021/0097965 A1* | 4/2021 | Hermanson | .......... | G10H 1/0008 |
| 2021/0210056 A1* | 7/2021 | Ummy | ................ | G10H 1/0551 |

FOREIGN PATENT DOCUMENTS

| | | | | |
|---|---|---|---|---|
| CN | 108735191 A | * | 11/2018 | |
| CN | 208654580 U | * | 3/2019 | |
| JP | 2004053866 A | * | 2/2004 | |
| JP | 2011118156 A | * | 6/2011 | |
| JP | 2016177026 A | * | 10/2016 | .......... G10H 1/0551 |
| KR | 102266874 B1 | * | 6/2021 | |
| WO | WO-2009127462 A1 | * | 10/2009 | .......... G10H 1/0066 |

OTHER PUBLICATIONS

Yonac, AirVox Spec List, accessed 2021, Copyright 2008-2021, http://yonac.com/AirVox/specs.html (Year: 2021).*

AirVox demostration Video, AirVox for iPhone and iPad—Touchless Synth, YouTube, posted Jul. 24, 2011, https://www.youtube.com/watch?v=U625-iic1QE (Year: 2011).*

Kenneth D. Skeldon, Lindsay M. Reid, Viviene McInally, Brendan Dougan, and Craig, "Physics of the Theremin", vol. 66, No. 11, Nov. 1998, pp. 945-955, Nov. 1998.

* cited by examiner

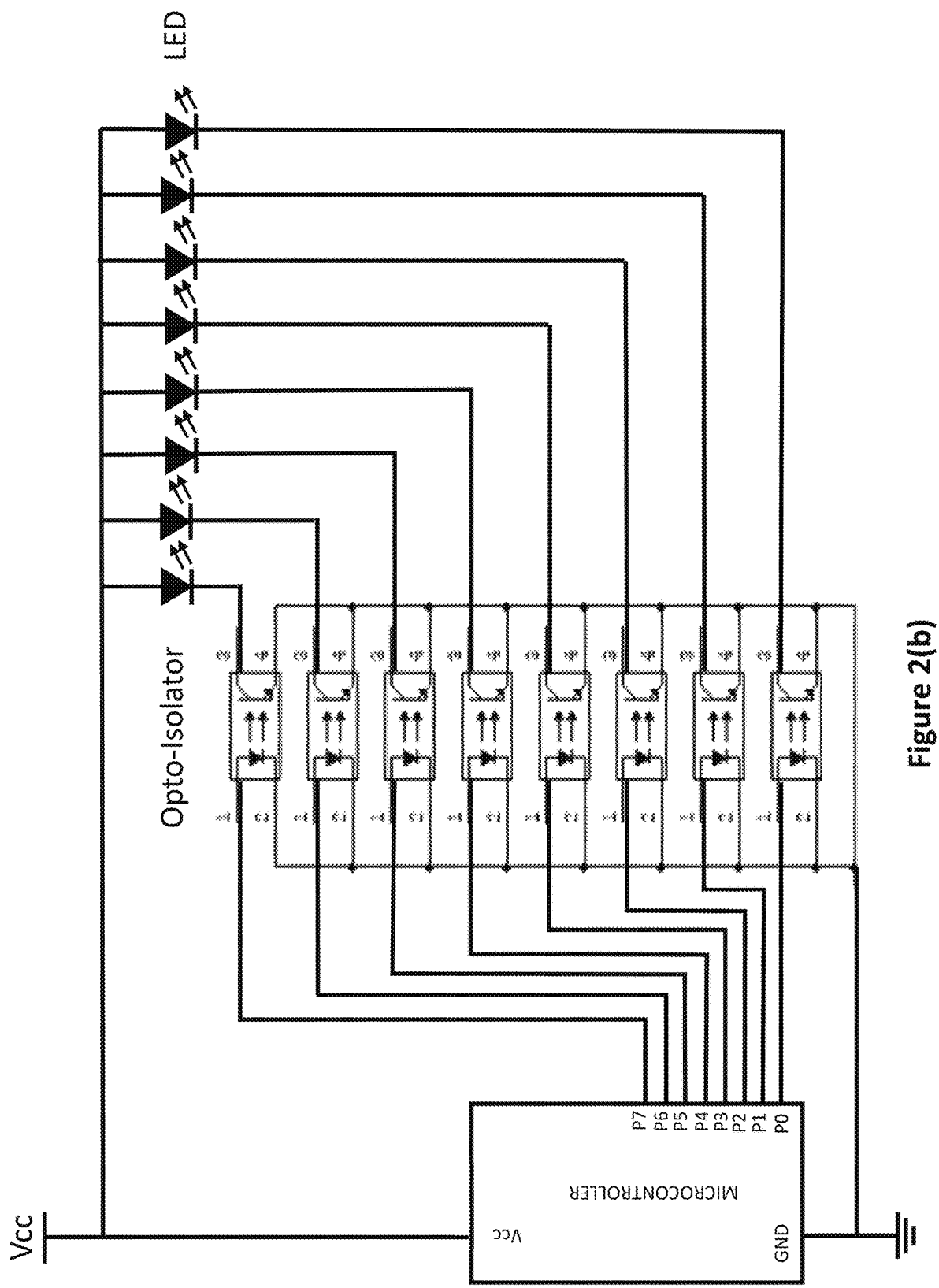

KEYLESS SYNTHESIZER

BACKGROUND OF THE INVENTION

1. Field of the Invention

The invention generally relates to musical synthesizers and more specifically to a keyless synthesizer for stimulating hearing, visual and muscle senses in children born with C.H.A.R.G.E. syndrome.

2. Description of the Prior Art

Children born with C.H.A.R.G.E. syndrome may benefit from hearing, visual, and muscle stimulation. However, heath care providers do not have anything that could stimulate all of these three senses. Rotating disco ball lights, cubes with musical sounds, etc. have been tried but nothing that could target all these senses simultaneously. This motivated the design of keyless synthesizer that could stimulate all the three senses (hearing, muscle movement and visual) at once while the patient plays and, at the same time, have fun with it.

SUMMARY OF THE INVENTION

The Synthesizer in accordance with the invention is unique from what is currently in the market for kids with special needs.
- It stimulates the child's visual and hearing skills while making music.
- This toy helps child improve their focus and spatial recognition skills.
- It uses inexpensive ultrasonic sensor instead of expensive Laser sensors.
- Since inexpensive components are used, the cost of the toy is kept low.
- Typical toys require buttons that when pressed, animal sounds (or other type of audio) are played. However, there are no buttons. The kids will operate in free space and will hear elegant music.
- It is very simple to work with, unlike some of the complex toys currently in the market. Children require no prior training in order to play with the toy. Some of the toys currently in the market require constant assistance for the user, in order to play with the toy. Otherwise, the kid may harm him/herself, but there is no harm present for the kids while playing with the toy.
- It targets not only children with special needs, but also, suitable for normal young kids.
- The Synthesizer is designed for children with special needs such as, delay growth, down syndrome, Alzheimer's etc. which encourages stimulation of three senses (hearing, muscle movement and visual) simultaneously while playing with it. I have not come across any other toy that does similar job.

BRIEF DESCRIPTION OF THE FIGURES

The above and other aspects, features and advantages of the present invention will be more apparent from the following description when taken in conjunction with the accompanying drawings, in which:

FIG. 2(b) is a circuit design for fiber optic lights using an opto-coupler;

DETAILED DESCRIPTION

Theory and Experimental Setup
a) Equipment and Components:

| Equipment | Components |
|---|---|
| Digital Multi-meter | Basic Stamp Microcontroller |
| Basic Stamp Software | Ultrasonic Parallax Ping Sensor |
| 3D printer | Photocouplers (PC817) (Opto-isolator) |
| Computer | Electronic Piano Music Box (off-the-shelf synthezier) |
| | (8)1.5 W DC 12 V Fiber Optics Lights (Fiber light) |

Basic Stamp 2 Microcontroller: A BASIC Stamp microcontroller is like a miniature single board computer complete with its own memory, processor unit, and digital inputs and outputs, all on a module the size of a postage stamp. BASIC Stamp modules can be easily programed with a personal computer using BASIC Stamp software.

Ultrasonic Distance Sensor: TheParallax Ultrasonic Distance Sensor provides precise, non-contact distance measurements from about 2 cm (0.8 inches) to 3 meters (3.3 yards). It is very easy to connect to microcontrollers such as the BASIC Stamp.

Electronic Plano Music Box (off-the-shelf synthesizer): This device has 8 different musical instrument tones, like plano, bass, violin, guitar, trumpet, drum, xylophone, music box. 20 distinct background rhythms, such as dance, hard rock, shuffle, jazz, funk, beat.

1.5 W LED Illuminator for Side Glow Fiber Optic Light: Off-the-shelf PMMA plastic end glow fiber optics cable used for decoration, such as, children sensory room home decoration.

Photocoupler (PC817): Photocoupler (optoisolator) generates light by using LED to generate a current, which is conducted through a phototransistor. The main applications of photocouplers are a) switching device to transfer pulse signals b) to transfer feedback error signals in analog switching regulators.

b) Principle of Operation

The system has three basic circuitries as shown in FIGS. 2a-2d: (a) an ultra-sonic range finder (b) eight different colored fiber optics LEDs and, (c) the off-the-shelf plano music box. These three systems are controlled by the microcontroller, basic stamp 2 shown FIG. 2(d).

c) Flowchart for the Basic Stamp 2 Programming Code

Figure 2A:
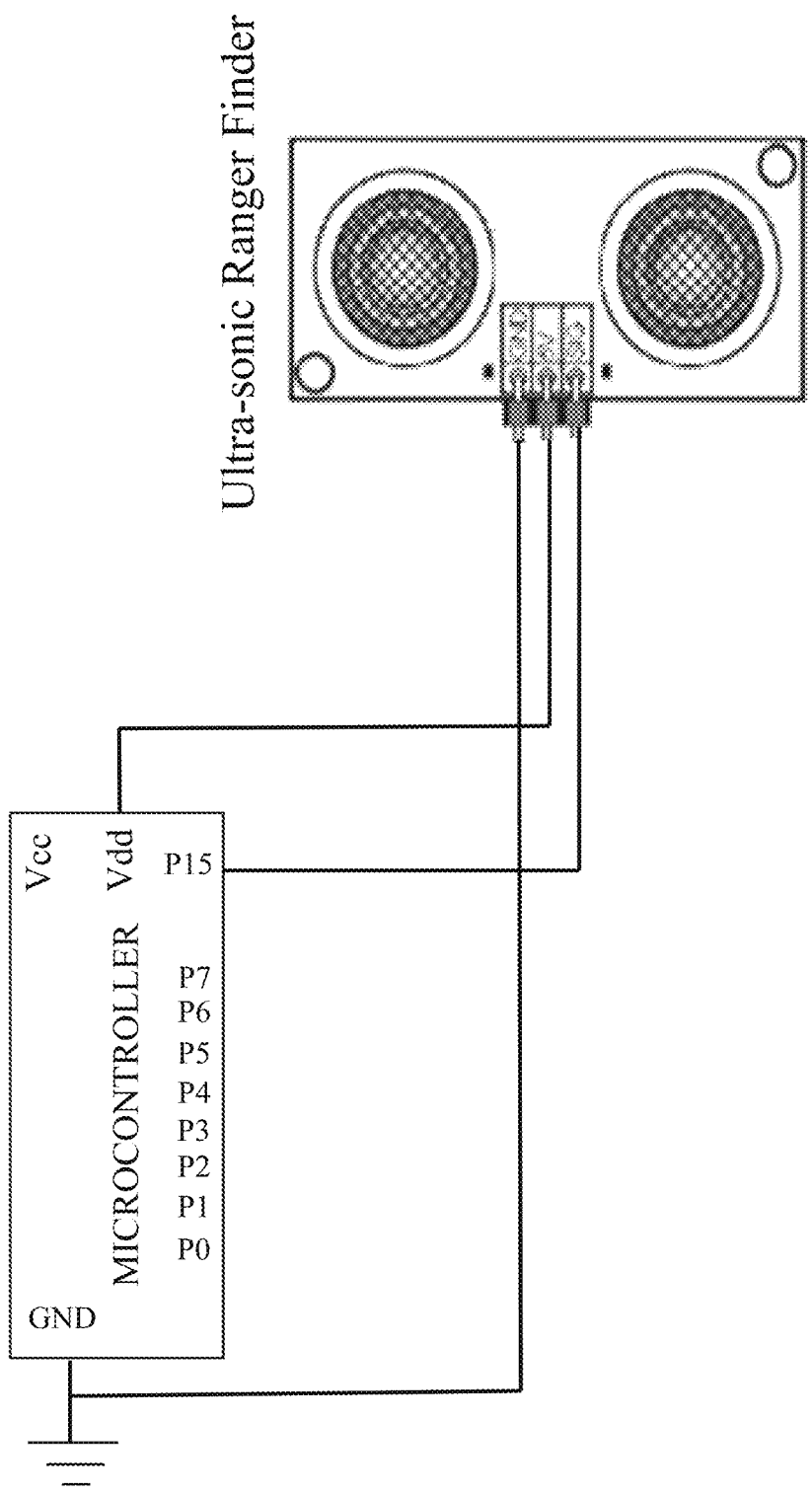
FIG. 2(a) is a circuit design of an ultra-sonic range finder.
Figure 2C:
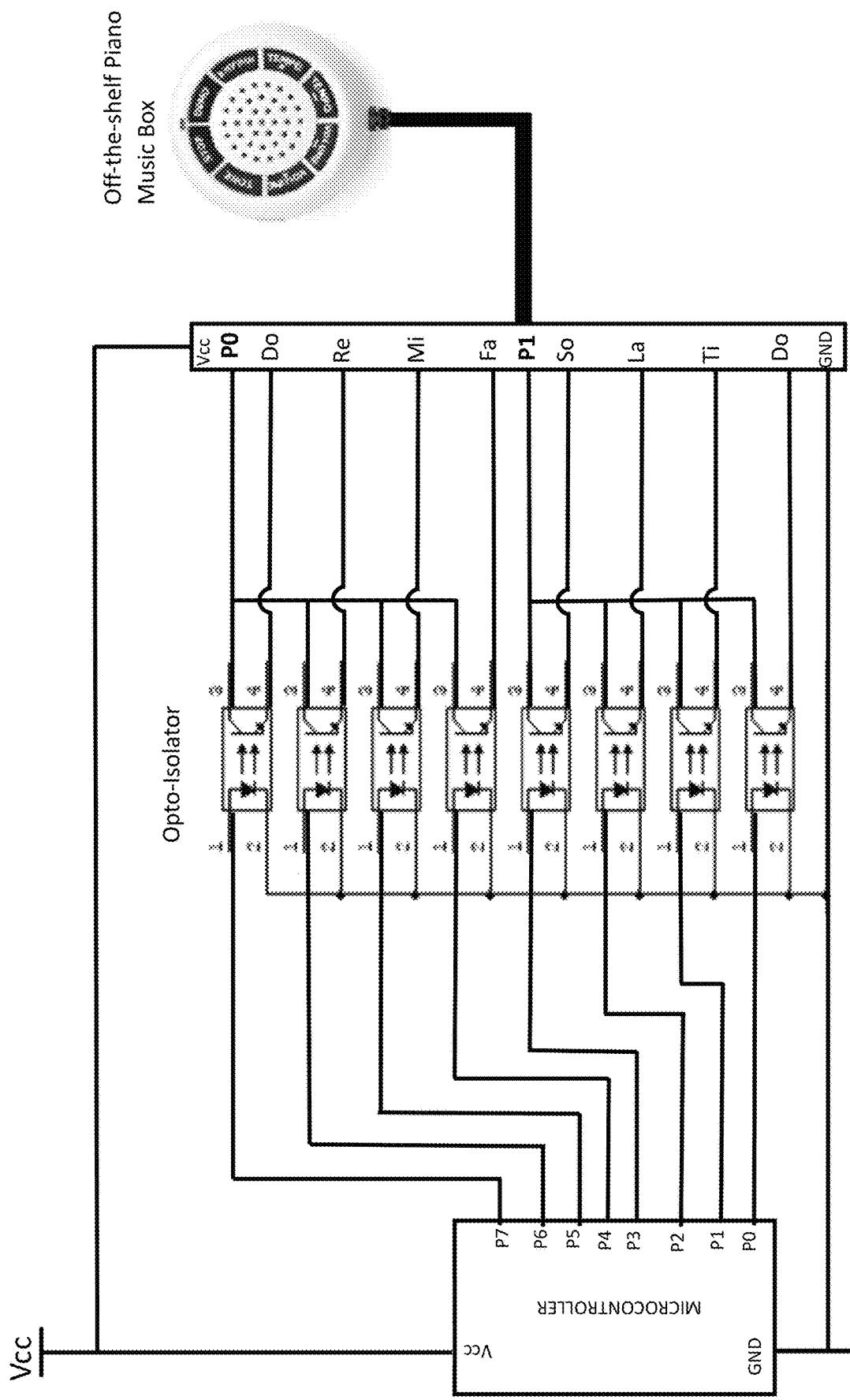
FIG. 2(c) is a circuit design for the electronic plano music box.
Figure 2D:
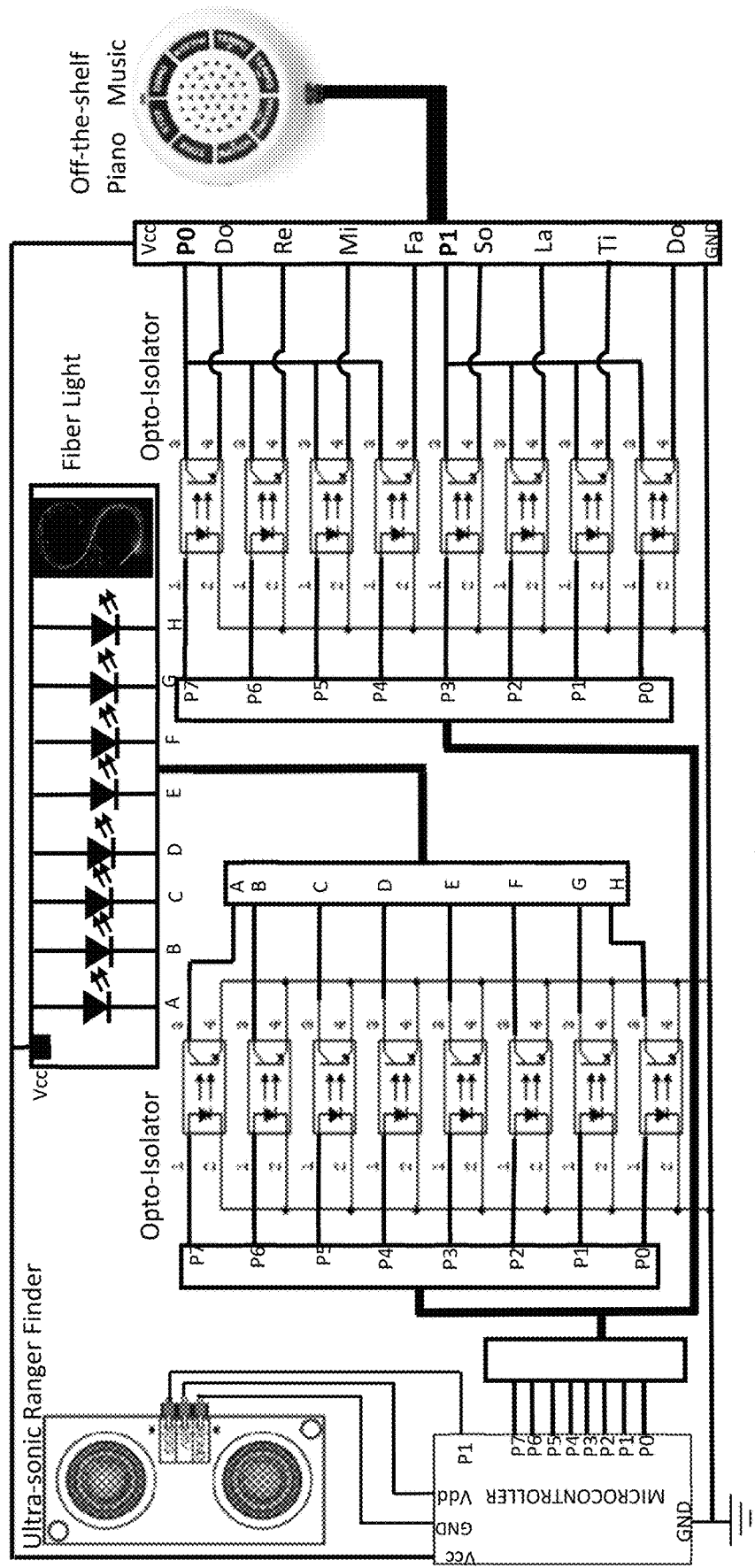
FIG. 2(d) is a complete circuit design of the range sensor, fiber light and music box along with the Basic Stamp.
Figure 2E:
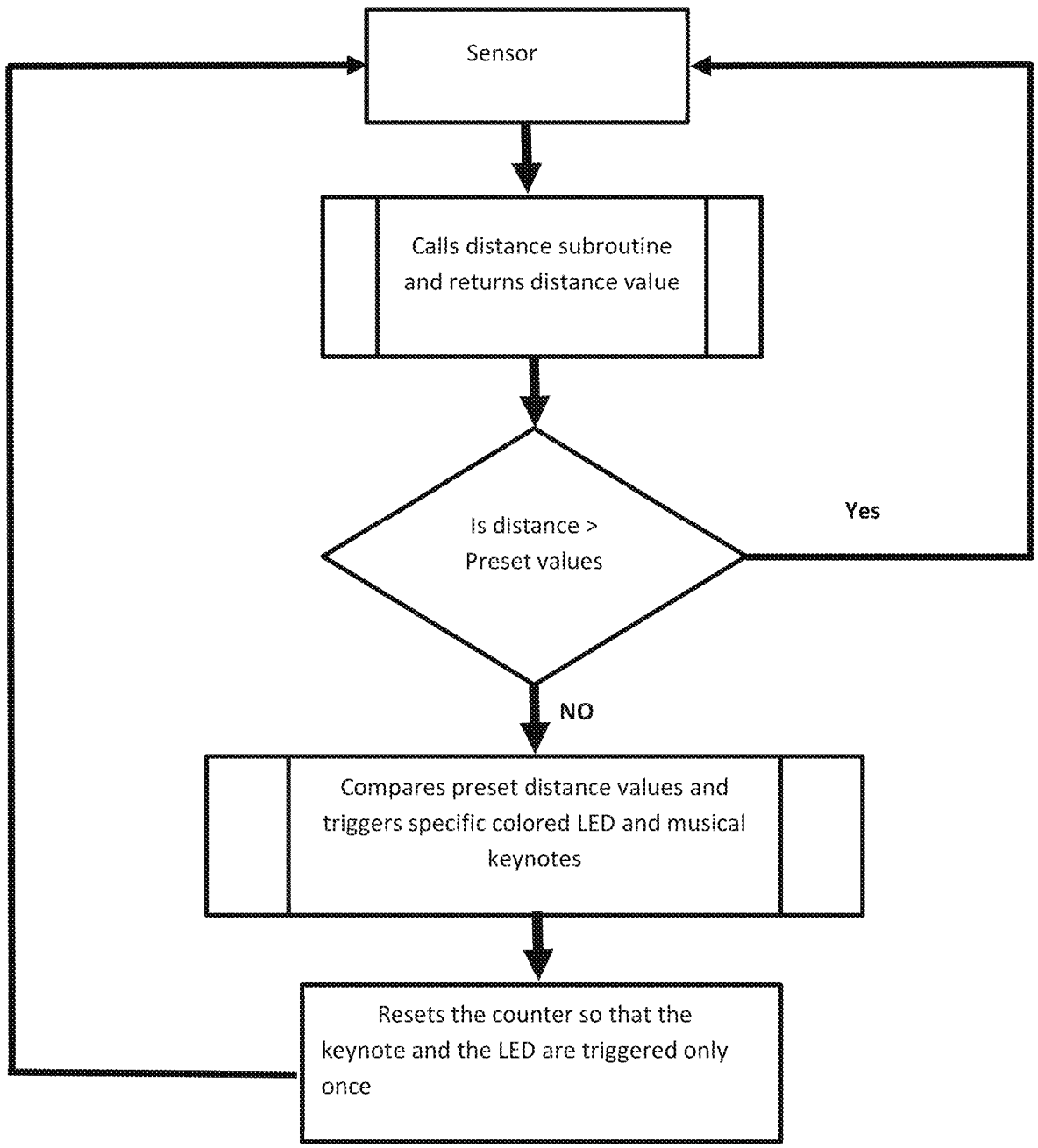
FIG. 2(e) is a flow chart illustrating the logical functions carried out by the keyless synthesizer in accordance with the invention.
Figure 3A:
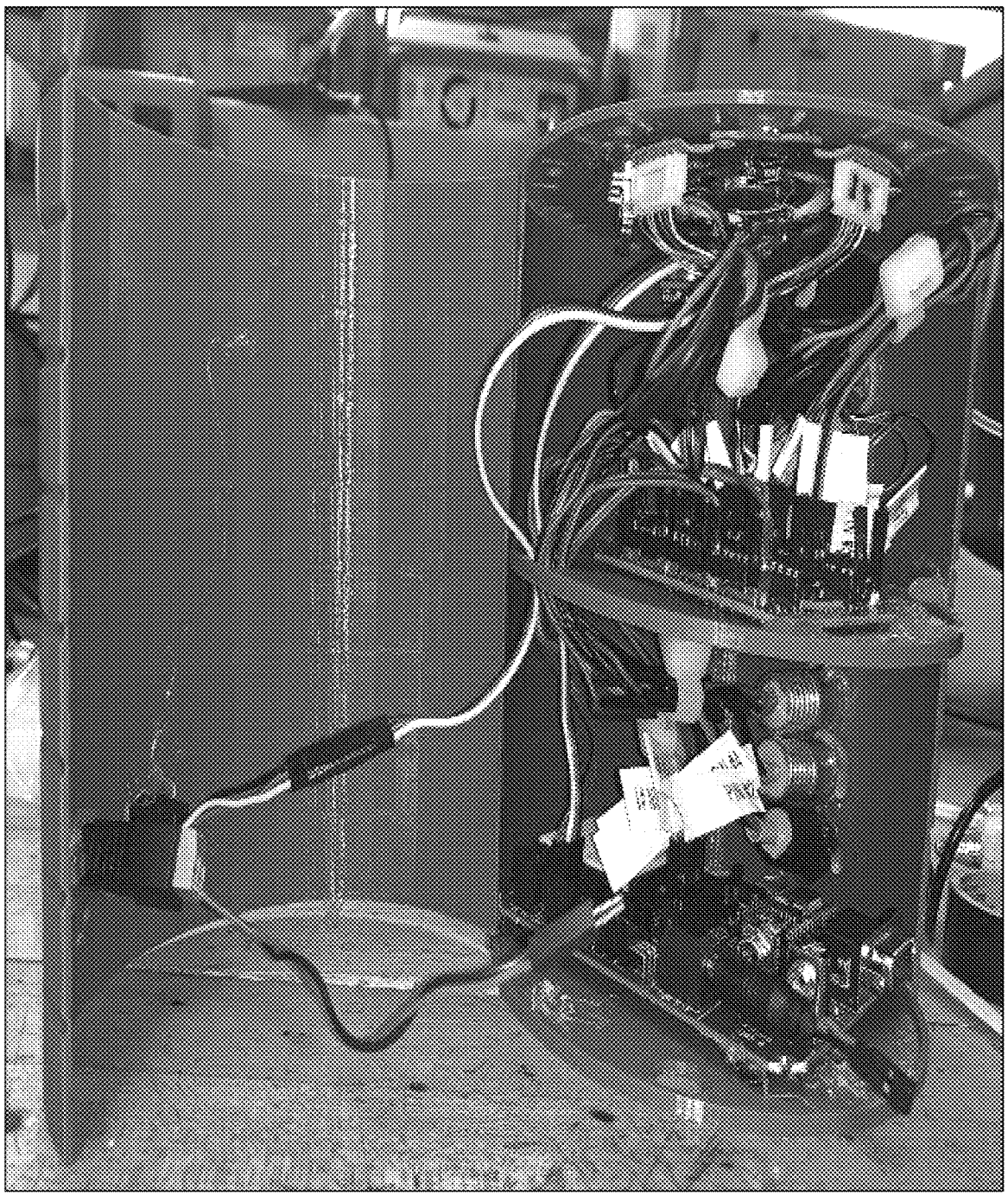
FIGS. 3(a)-3(e) show components designed and printed on a 3D printer.
Figure 3B:
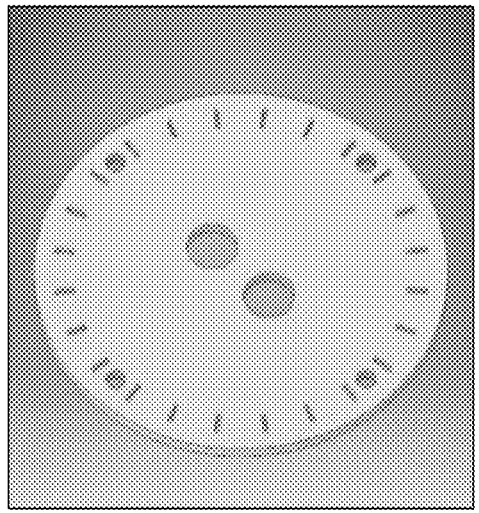
Figure 3C:
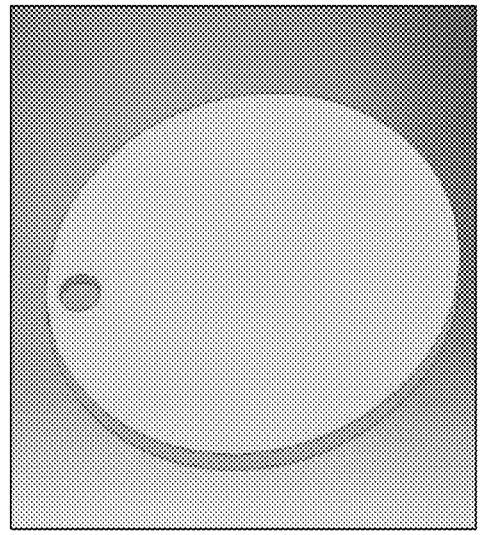
Figure 3D:
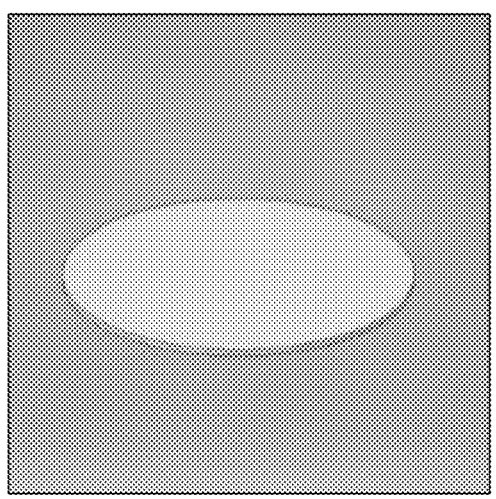
Figure 3E:
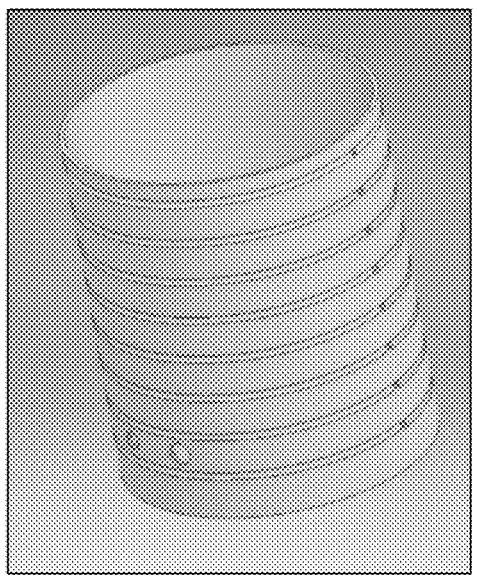

Referring to the flow chart shown in FIG. 2(e), when an operator places his/her hand over the top of the ultra-sonic sensor the microcontroller calculates the distance between the hand and the sensor and then determines which tone to play. Each tone is accompanied by the specific colored LED, thereby, triggering them simultaneously. This unique feature of the toy will encourage the user to associate color, knowledge of spatial dimension and tone, which helps the user to focus and concentrate while playing. There are eight preset distance ranges associated with eight different tones and colored LEDs. Furthermore, if the user does not change the position of his/her hand the tone and the light will be activated only once and so, the user must keep on moving his/her hand in order to play different musical tone and fiber optics LEDs.

Figure 1A:
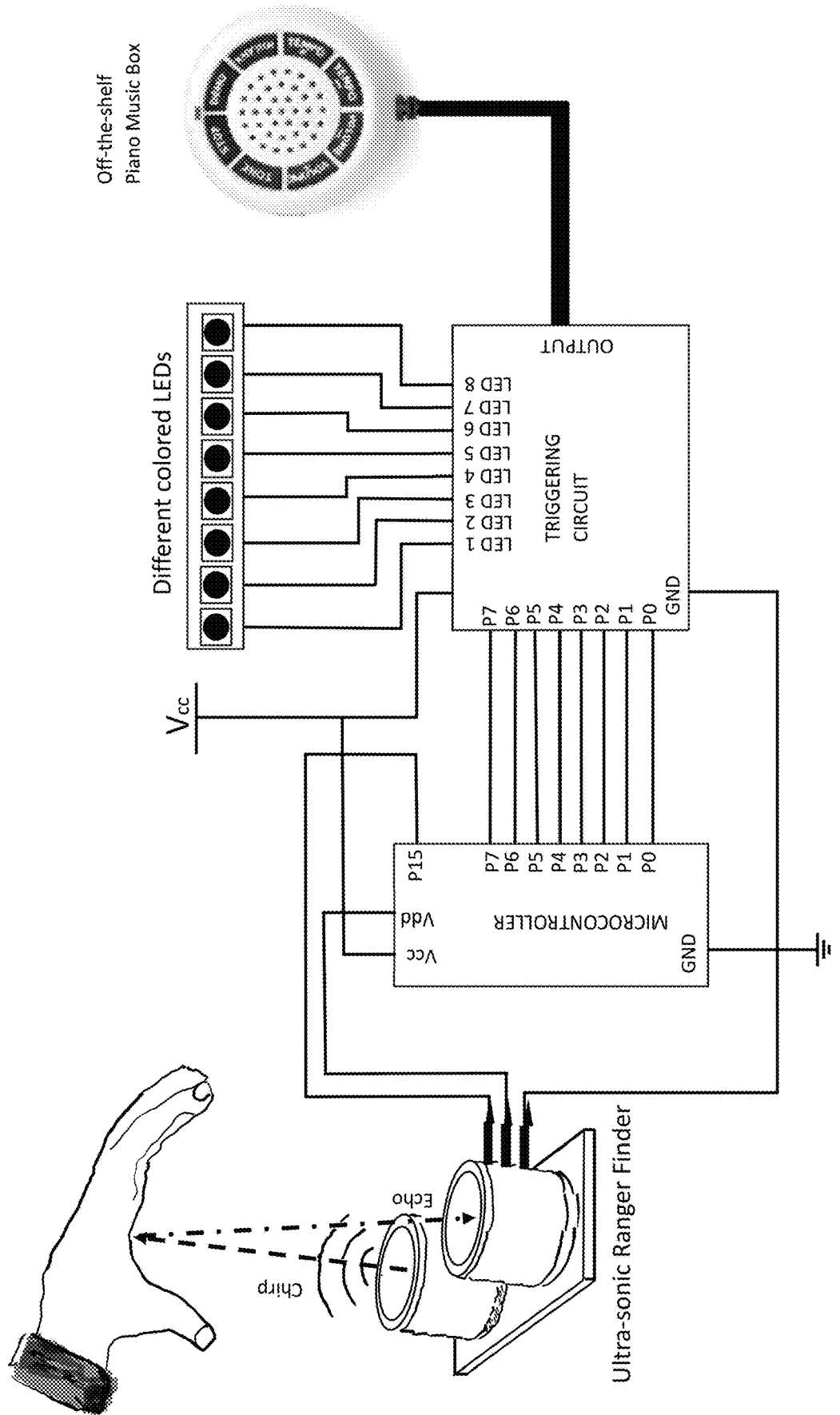
FIG. 1(a) is an ultrasonic range sensor that measures the distance and triggers different tones and light.
Figure 1B:
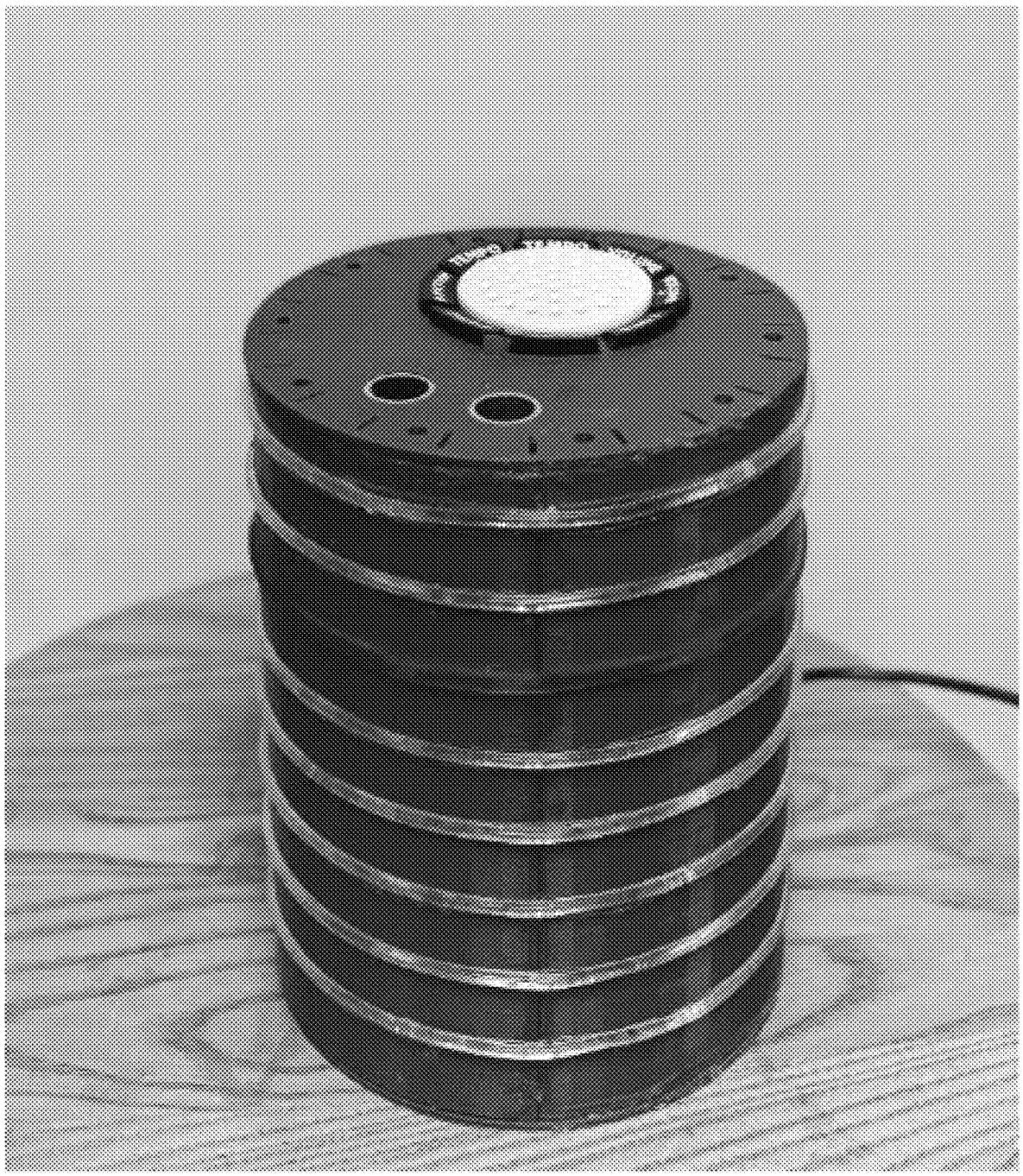
FIG. 1(b) shows a working prototype of the synthesizer.

In order to play with the toy, the patient moves his/her hand upward and downward, the system reads the distance between the sensor and the hand, and sounds a certain key of the synthesizer, and at the same time, trigger different color fiber lights as shown in the FIG. 1. Each tone also represents a specific color light. These interactions between the patient, the colorful lights and the music tones, will encourage him/her to move, communicate, manipulate his/her hands and at the same time have lots of fun.

d) Design and 3D Printing of Different Parts of the Toy

The various parts of the toy, such as the base, top and the case were designed by using AutoCAD and then printed by using 3D Printer. The cylindrical case design with ridges for fiber optics, as shown in FIG. 3, was chosen due to its aesthetically appealing look.

One might think that the subject synthesizer is similar to the Theremin, which is a musical instrument patented in 1928 and is played without any physical contact whatsoever between the performer and the instrument. However, it is both functionally and technologically quite different from the synthesizer in accordance with the present invention.

Figure 4A:
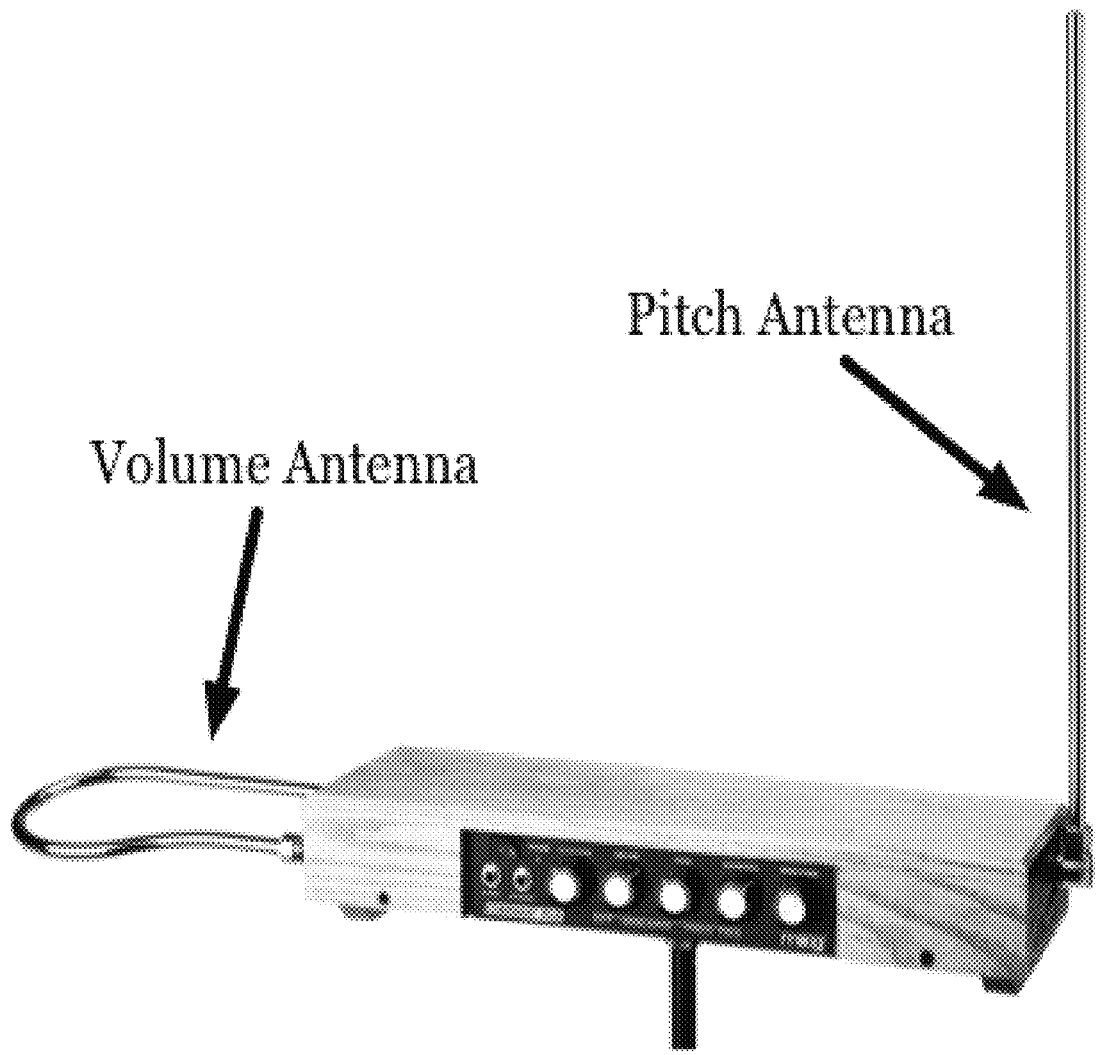
FIG. 4(a) shows a photograph of Theremins with pitch and volume antennas.

Theremin has two antennas that protrude out of the device as shown in FIG. 4(a), with which one controls the volume and the pitch of the instrument. The vertical antenna (pitch antenna) on the right senses the proximity of the player's one hand to control the pitch while the horizontal antenna on the left senses the proximity of the player's other hand and controls the volume to the tone. To adjust the pitch, one moves one's hand closer to the pitch antenna to increase the pitch, and further from the antenna to decrease the pitch. The instrument is set to be silent by touching the volume antenna, and it gradually gets louder as one moves one's hand away from it.

Figure 4B:
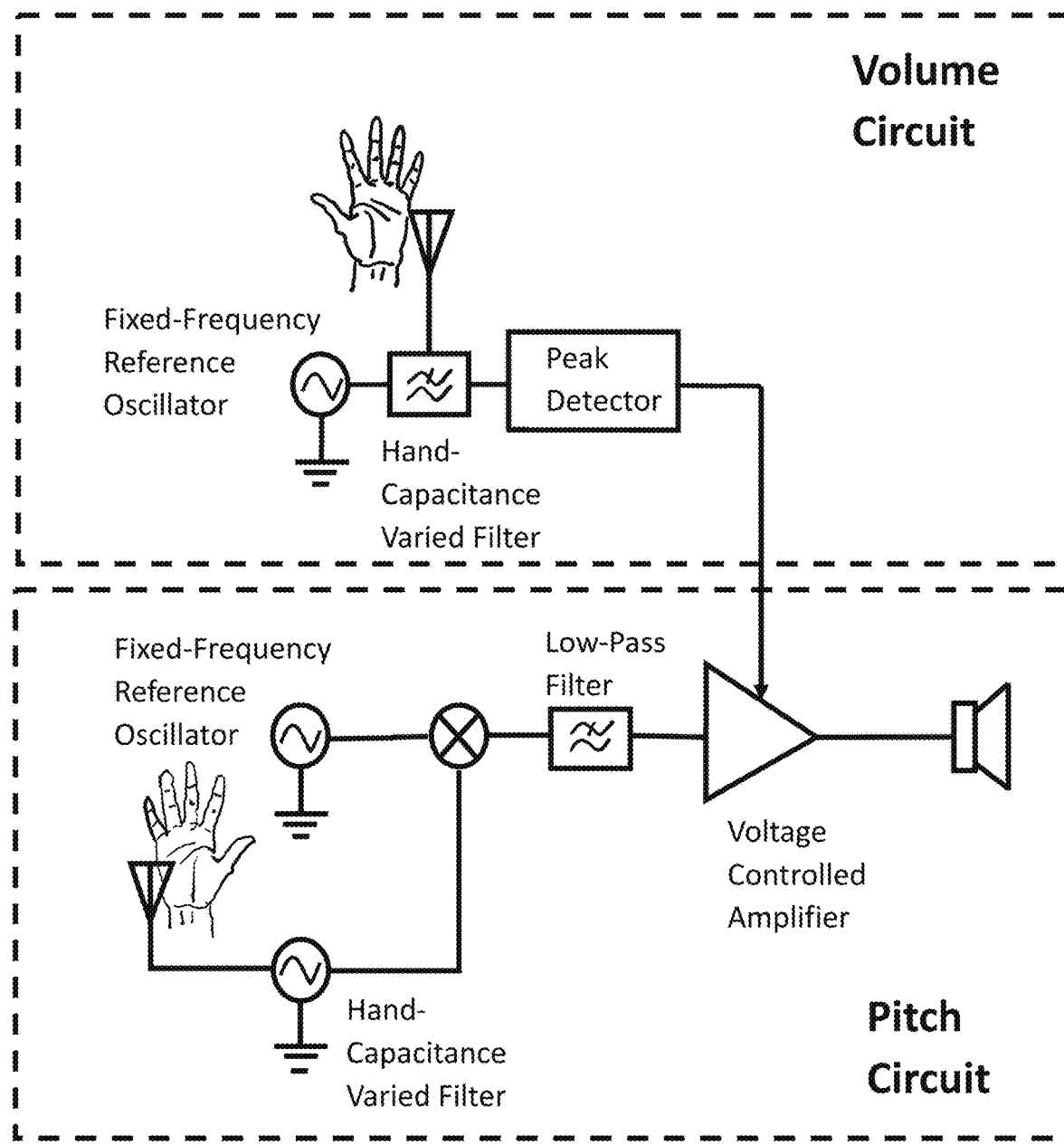
FIG. 4(b) shows the analog Theremin block diagram circuit showing volume circuit and pitch circuit.

The Theremin uses the heterodyne principle (frequency mixing) to generate an audio signal. The instrument's pitch circuitry includes two radio frequency (RF) oscillators as shown in FIG. 4(b). One oscillator (Fixed Frequency Reference Oscillator) operates at a fixed frequency while the frequency of the second oscillator is almost identical, however, can be changed by placing player's his/her hand in front of the antenna. The pitch and volume are controlled using similar circuit. Placing the hand in front of the antenna changes the capacitance of the second oscillator and the Theremin tone frequency can be expressed as:

$$f_T = \frac{1}{2\pi\sqrt{L}}\left[\left(\frac{1}{C_1} + \frac{1}{(C+C_s+C_A)}\right)^{0.5}\right]_{C_A=C_A(x_0)}^{C_A=C_A(x)} \quad (1)$$

where C is circuit component value, $C_s$ is the all other stray capacitances between the circuit and the antenna and $C_A$ is the antenna capacitance [1]. When the performer's hand is at initial distance $x_0$ from the pitch antenna and moves closer to the antenna say distance x, $C_A$ modifies and thus changes the frequency of the pitch frequency. The relationship between the Theremin tone frequency ($f_T$) and the proximity of the performer's hand to the pitch antenna is graphically represented in FIG. 5(b).

Note that antennas of both the pitch and the volume are directly coupled to the tuned circuit of the oscillators. The Theremin's musical key pattern as shown the FIG. 5 (b) behaves linearly when the player is very far from the antenna but becomes non-linear as the player approaches the antenna. If the performer begins to deviate towards the antenna, then the movements of the fingers cause rather large pitch deviation. A small tremor of the hand is enough to induce vibrato on the tone. This highly nonlinear characteristic of the instrument makes it very difficult for a novice to play a melodious tone. Furthermore, the player not only has to control the pitch with one hand, but also, he/she has to control the volume with the other hand. It is a very complex instrument to use and takes many hours of practice and excessive training in order to produce a good music. This might lead to frustration and ultimately discourage a beginner to stop playing altogether.

The Invention

Unlike Theremin, the keyless synthesizer does not use the heterodyne (frequency mixing) principle to generate an audio signal. The block diagram in FIG. 6 (a) shows the role that the ultrasonic range sensor plays in triggering the proper tone/key of the synthesizer. Note that the two input sensors (pitch antenna and volume antenna) of Theremin are interconnected to the hardware and are responsible for creating melodies, however, the ultrasonic sensor used in the Keyless synthesizer is independent of the synthesizer's circuit and therefore, plays no role in creating any melody. The sensor emits an ultrasound pulse which gets reflected back to the receiver whenever the performer's hand is placed in front of the sensor (see FIG. 6 (a)). The microcontroller then converts the delay time into the distance, thereby, triggering different switches/notes (1 through 8 notes). The linear relationship between the distance read and the particular key/note played (see FIG. 6. (b)), makes it very simple and easy for the performer to remember the positions of different tones. Thus, the Keyless Synthesizer can be programmed to play either higher notes at close proximity and lower notes at far distance from the sensor or lower notes at closer to the sensor and high notes further away. The equation for playing higher note (high pitch) at close proximity and lower notes at far distance is given by $$S_w=0.5d+0.5 \quad (2)$$

while the equation for playing low notes at close proximity and high notes at far distance is given by $$S_w=-0.5d+8.5 \quad (3)$$

Figure 5A:
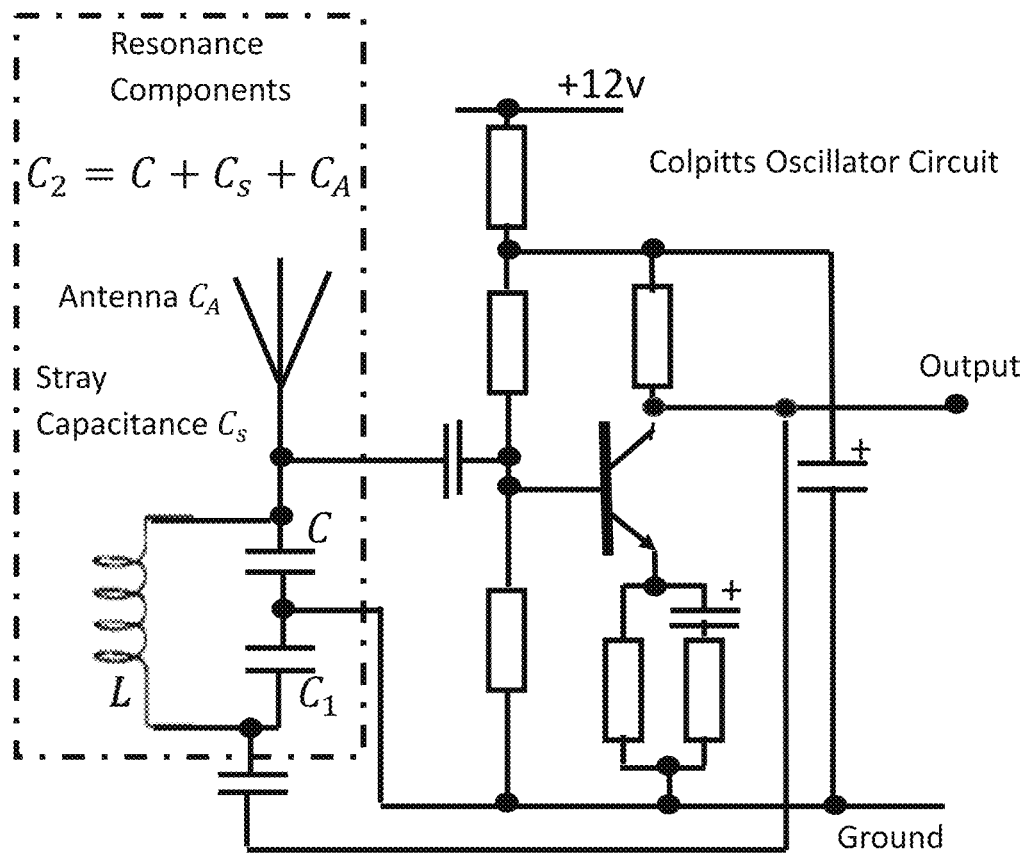
FIG. 5(a) is a schematic diagram of a transistor oscillator used in the Theremin circuitry, highlighting the pitch antenna that determines the resonance frequency, and hence affect the Theremin pitch.
Figure 5B:
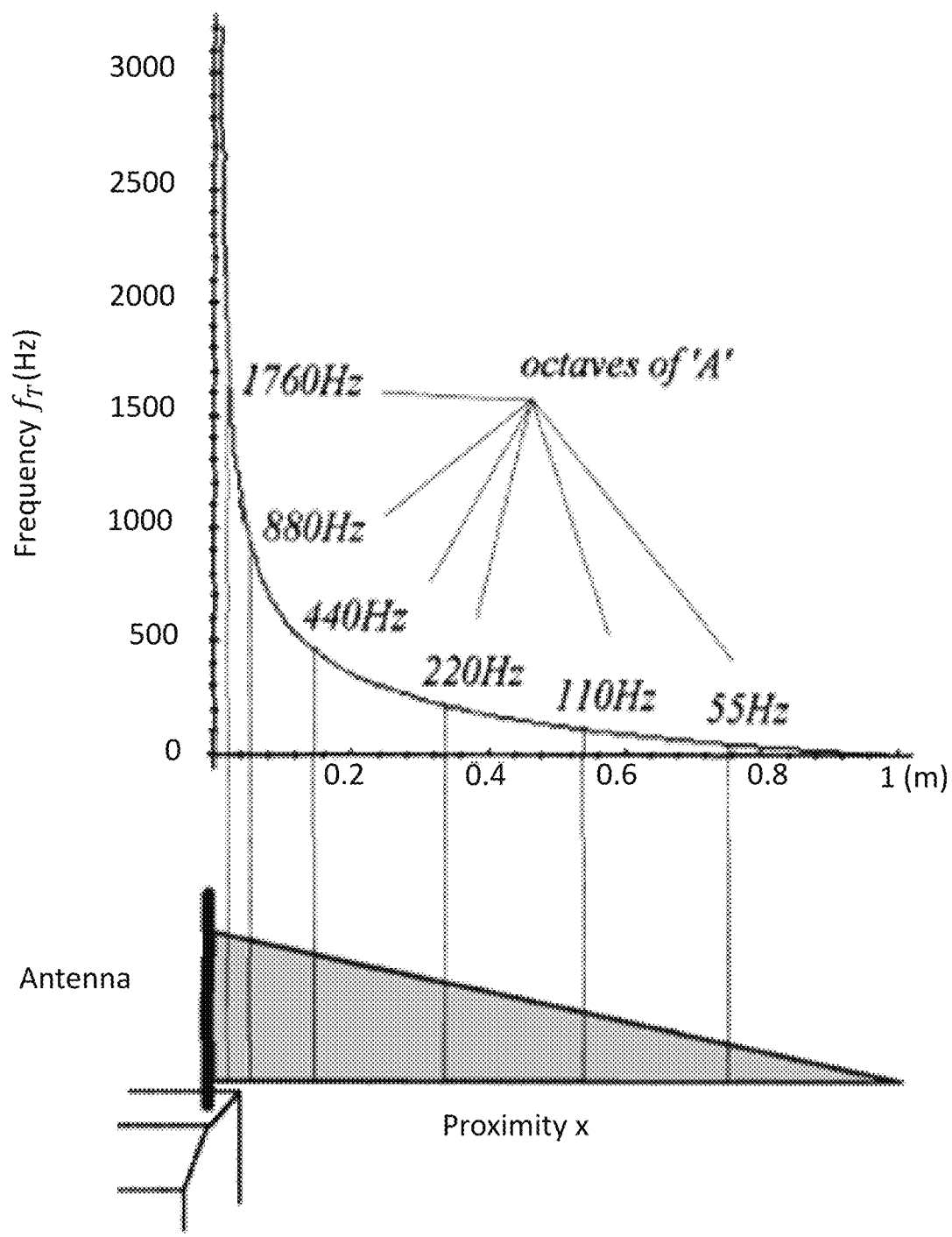
FIG. 5(b) illustrates the non-linear relationship between Theremin pitch and proximity to a player's hand.
Figure 6A:
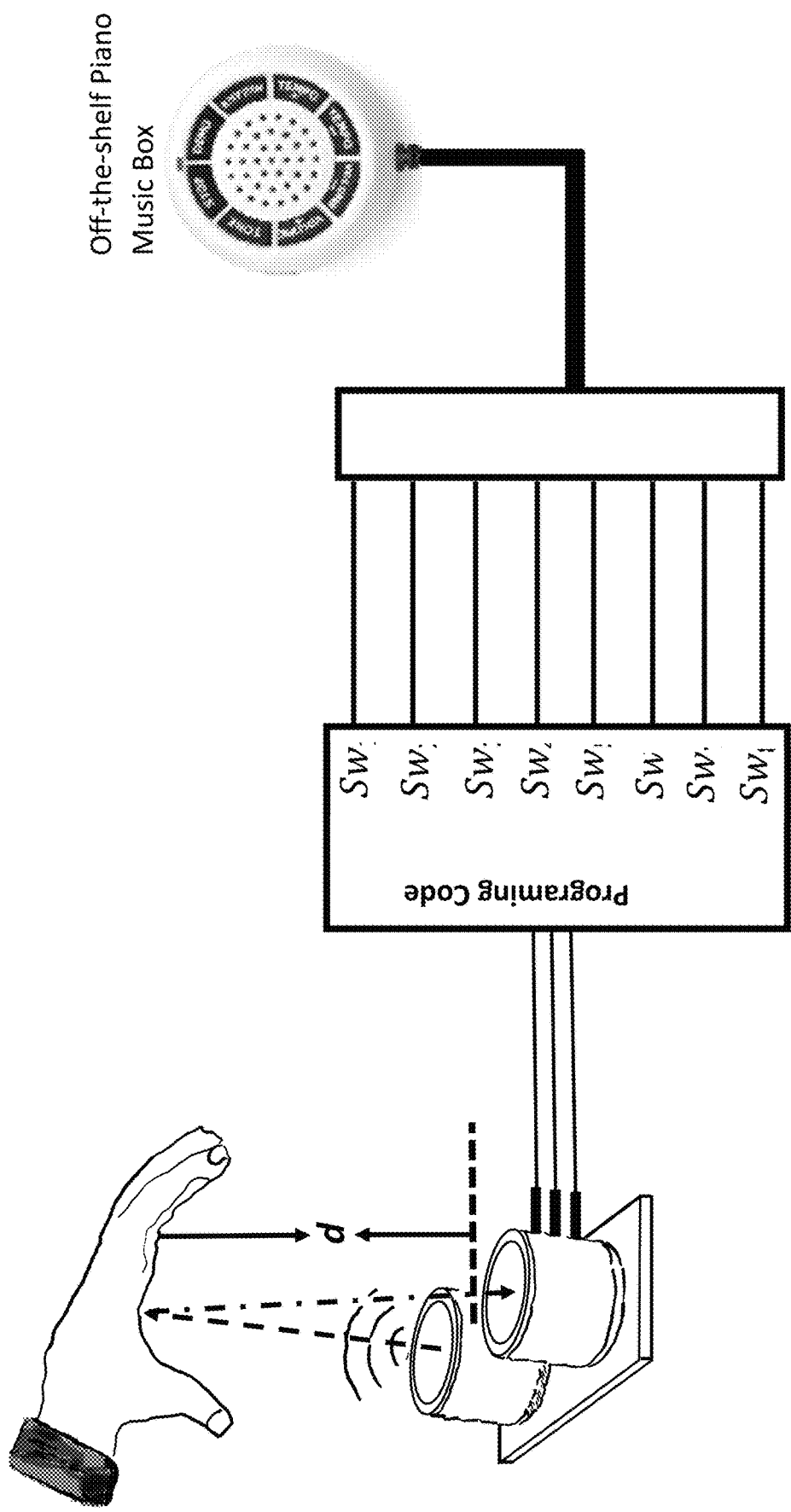
FIG. 6(a) is a block diagram of a keyless synthesizer showing the connection between ultrasonic range sensor and a microcontroller.
Figure 6B:
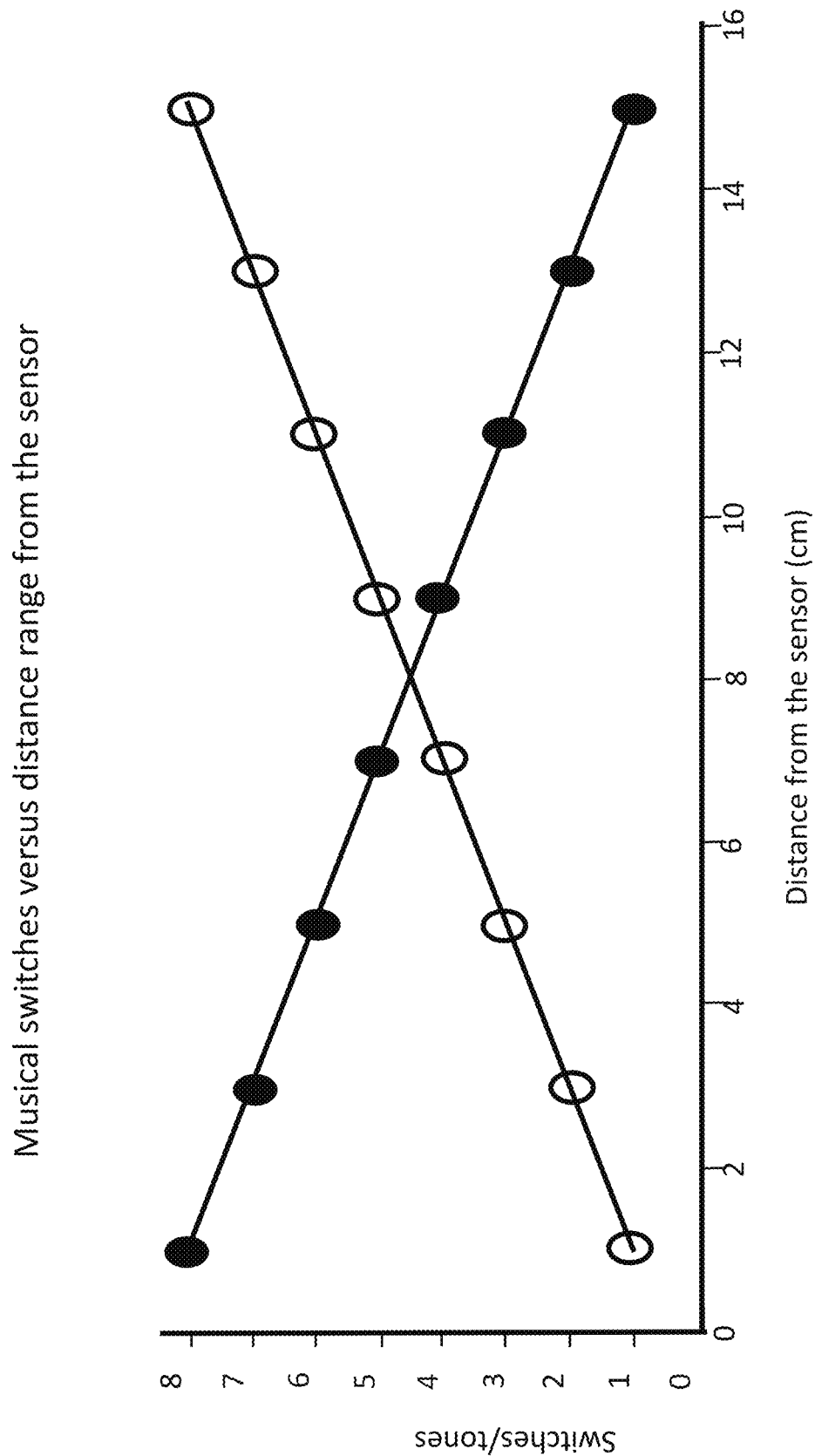
FIG. 6(b) is a graphical representation of musical switches versus distance range from the sensor.

However, this flexibility of pitch/volume distance choice is not possible for Theremin. High notes are created only when the performer's hand is closer to the pitch antenna of Theremin while low notes are generated away from the pitch antenna and this relationship cannot be changed. Furthermore, the relationship between the pitch and distance becomes nonlinear as shown in FIG. 5 (b) when the performer's hand gets closer to the antenna. Hence, a small tremor of the hand is enough to induce vibrato on the tone and it becomes very difficult to control. This is not the case with the Keyless synthesizer. The code uses a linear equation in order to activate a specific switch/tone as shown in FIG. 6(b).

Suppose the performer's hand is placed at a distance d such that 4 cm≤d≤6 cm, we can program our microcontroller by using the equation (2). It will turn on switch $Sw_3$ and a particular tone will be played. Thus, we can conclude that unlike Theremin the distance sensor is not a part of the synthesizer's circuitry. The distance, d does not control the pitch directly but can be programmed. Unlike Theremin, the low or high pitch tones are not set by the hardware but can be easily controlled by the software. Also, note that the tone will be played only once until the player moves his/her hand to different location mimicking the actual key of the synthesizer. In case of Theremin, a particular tone will be played continuously until the performer removes his/her hand completely from that position or reduce the volume by using the volume control antenna.

It is to be noted that in case of Theremin, one needs to control two sensors, pitch and volume simultaneous, and hence, requires two hands in order to play a melody. On the contrary, the Keyless Synthesizer requires only one hand to control the distance. The volume of the speaker is set by the volume knob as shown in FIG. 6(a) which is a part of the off-the-shelf synthesizer and the player just set it to desire loudness only once and requires no further control. Moreover, we can also exploit the existing features of synthesizer, such as Tone, Temp etc. with our system.

Figure 7:
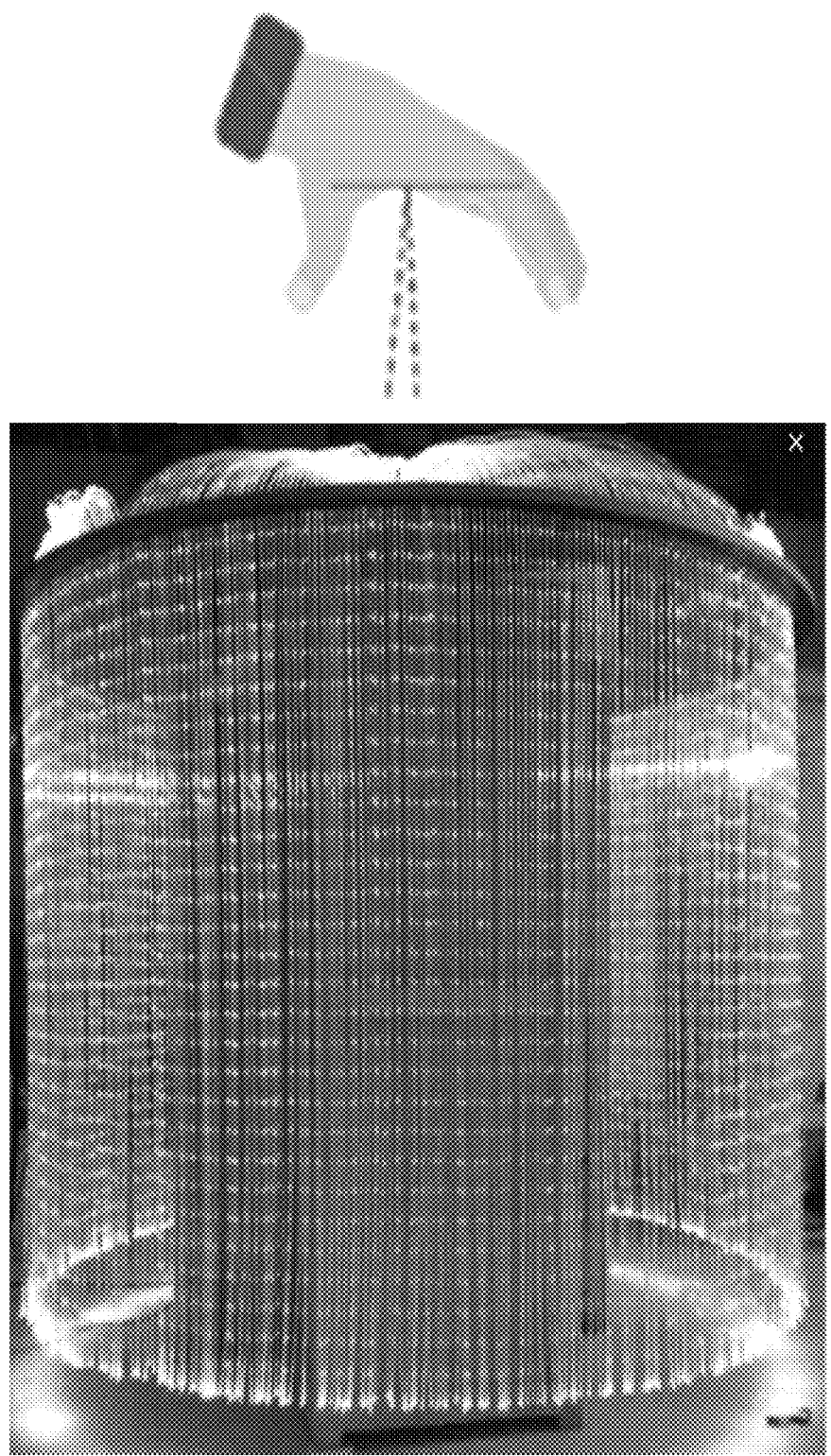
FIG. 7 shows a modification of the casing of the toy.

The casing of the synthesizer may be modified for aesthetic look such us shown in FIG. 7. The fiber optic waterfall light curtain wall may be included instead of attaching around the casing. It can also be used for general purpose such as, for birthday parties, holiday parties, and anniversary celebrations. This can be an excellent centerpiece or a fun decoration for a child's room.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

REFERENCES

1. Kenneth D. Skeldon, Lindsay M. Reid, Viviene McInally, Brendan Dougan, and Craig, "*Physics of the Theremin*", Vol. 66, No. 11, November 1998, pp. 945-955, November 1998.

The invention claimed is:

1. A keyless synthesizer operational by a single hand of the user comprising an ultrasound range sensor responsive to a distance "d" of a user's single hand from the sensor for generating a sensor signal corresponding to said distance "d"; a programmable microcontroller programmed to convert said sensor signal to one of a plurality of discrete signals; a synthesizer responsive to each discrete signal for generating a discrete tone; and a multi-color generator responsive to each discrete signal for generating a discrete color, whereby for each discrete signal corresponding to a distance "d" both a discreet tone and an associated discreet color are generated.

2. A keyless synthesizer as defined in claim 1, wherein said programmable microcontroller comprises a microcontroller that uses software for composing and compiling programs written in basic language.

3. A keyless synthesizer as defined in claim 2, wherein said ultrasound range sensor is selected to provide non-contact distance measurements from about 2 cm (0.8 inches) to 3 meters (3.3 yards).

4. A keyless synthesizer as defined in claim 1, wherein said synthesizer comprises an electronic piano music box that can generate a plurality of musical instrument tones.

5. A keyless synthesizer as defined in claim 1, wherein said multi-color generator comprises a glow fiber optics cable.

6. A keyless synthesizer as defined in claim 1, wherein said microcontroller is programmed to detect eight preset distance ranges associated with eight different tones and eight different associated colors.

7. A keyless synthesizer as defined in claim 6, wherein said microcontroller is programmed to generate a single tone and single color for a predetermined period of time for each for each detected range until a next or different range is detected.

8. A keyless synthesizer as defined in claim 6, wherein said LEDs are associated with color fiber lights.

9. A keyless synthesizer as defined in claim 1, wherein said multicolor generator comprises LEDs for generating said discreet colors.

10. A keyless synthesizer as defined in claim 1, wherein said ultrasound range sensor emits ultrasound pulses whenever a user places a hand over said sensor, and said microcontroller converts delay times into distances to trigger different notes.

11. A keyless synthesizer as defined in claim 10, wherein said microcontroller is programmed to provide a linear relationship between distance read and an associated note played to facilitate a user to remember different positions and associated different tones.

12. A keyless synthesizer as defined in claim 11, wherein said linear relationship is defined by $$Sw = k1d + k2$$

wherein Sw represents a predetermined color and d is the distance between a user's hand and said sensor and k1 and k2 are constants to generate higher notes at closer proximity to said sensor and lower notes at more distant distances from said sensor.

13. A keyless synthesizer as defined in claim 11, wherein said linear relationship is defined by $$Sw = -kid + k2$$

wherein Sw represents a predetermined color and d is the distance between a user's hand and said sensor and k1 and k2 are constants to generate lower notes at closer proximity to said sensor and higher notes at more distant distances from said sensor.

14. A keyless synthesizer as defined in claim 1, wherein said tones are generated by programmed software within said microcontroller.

15. A method of generating discreet tones and associated colors as a function of the positions of a user's hand in relation to a sensor, comprising the steps of using a keyless synthesizer operational by a single hand of a user; using an ultrasound range sensor responsive to a distance "d" of the user's hand from the sensor for generating a sensor signal corresponding to said distance "d"; using a programmable microcontroller programmed for converting said sensor signal to one of a plurality of discrete signals; a synthesizer responsive to each discrete signal for generating a discrete tone and a multi-color generator responsive to each discrete signal for generating an associated discreet color, whereby for each discrete signal corresponding to a distance "d" both a discreet tone and a discreet color are generated.

* * * * *